Figure 3:
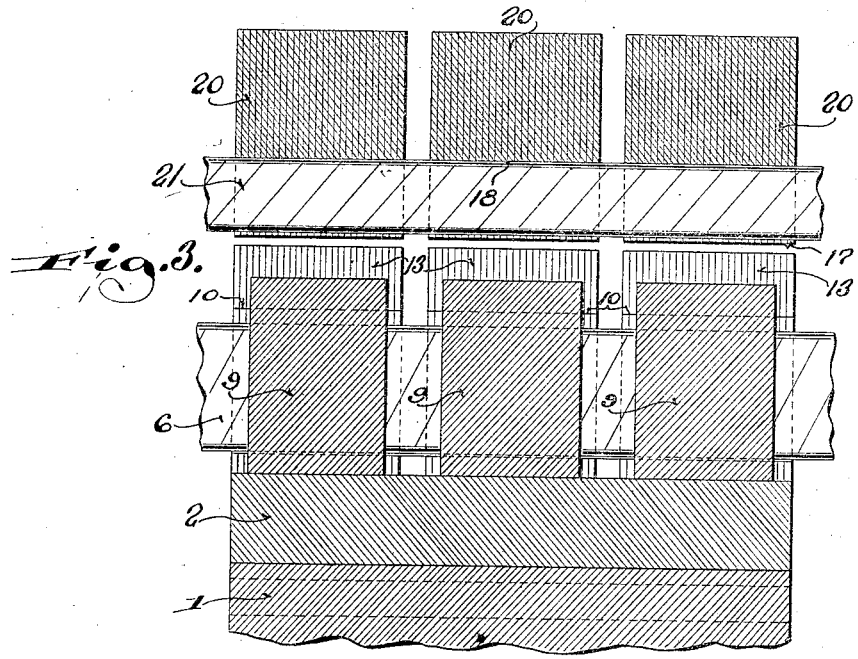

April 6, 1926.
J. F. H. DOUGLAS ET AL
DYNAMO ELECTRIC MACHINE
Filed Feb. 14, 1924
1,580,022
2 Sheets-Sheet 1
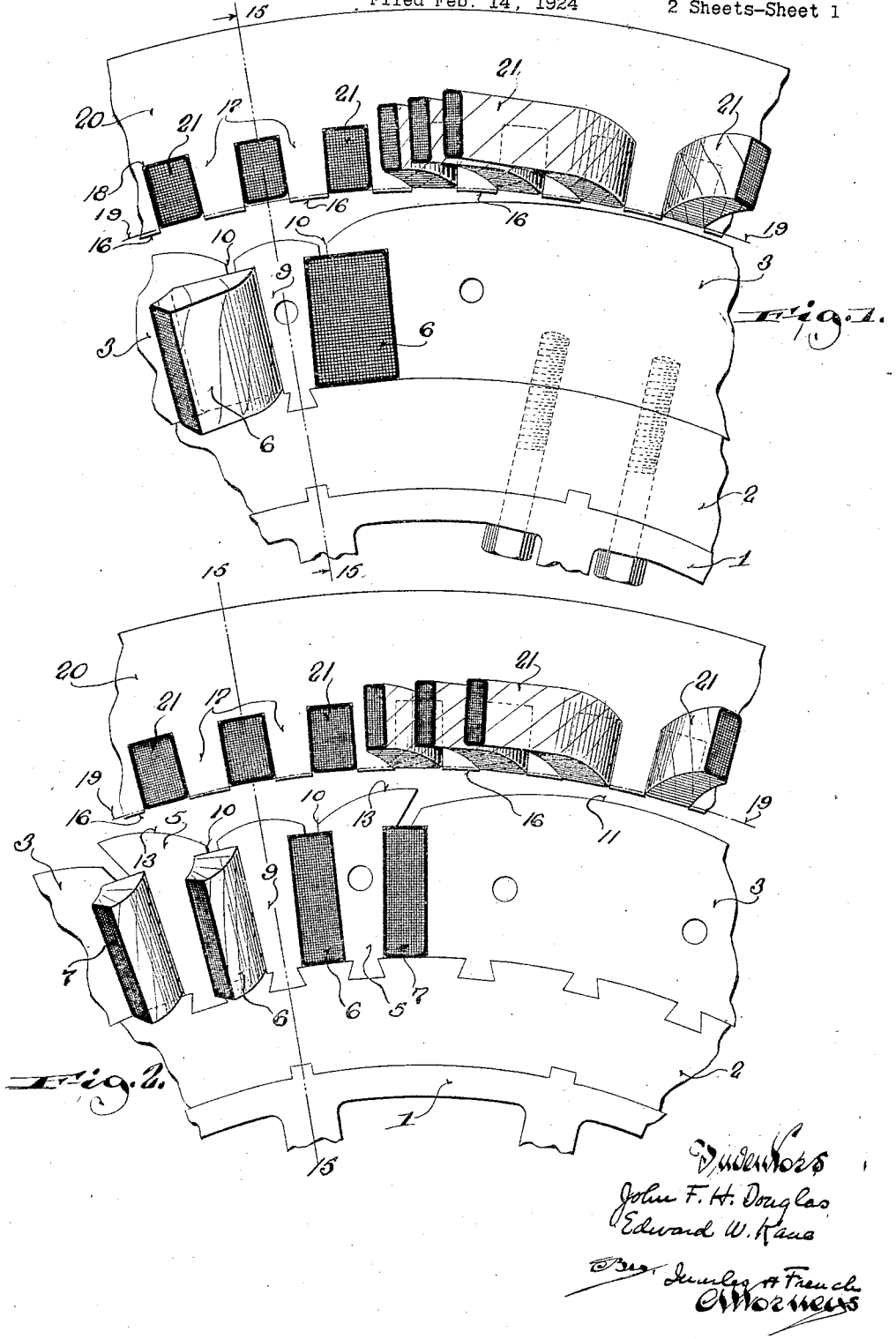

Patented Apr. 6, 1926.

1,580,022

UNITED STATES PATENT OFFICE.

JOHN F. H. DOUGLAS AND EDWARD W. KANE, OF MILWAUKEE, WISCONSIN.

DYNAMO-ELECTRIC MACHINE.

Application filed February 14, 1924. Serial No. 692,714.

*To all whom it may concern:*

Be it known that we, JOHN F. H. DOUGLAS and EDWARD W. KANE, citizens of the United States of America, and residents of Milwaukee, in the county of Milwaukee and State of Wisconsin, have invented new and useful Improvements in Dynamo-Electric Machines, of which the following is a description, reference being had to the accompanying drawings, which are a part of the specification.

Our invention relates to dynamo electric machines of the synchronous type, and more particularly to the pole shoes or portions of the poles adjacent to and facing the armature. Our invention relates to the better shaping of the pole shoe near the tip in order to secure a better wave form of induced electrical pressure or electromotive force, that is, one that deviates less from true sine wave or other desired waves of flux density which do not deviate more than 10% from the theoretical true sine wave, and deviate only in such a manner that the components which interfere with telephone circuits are either eliminated or greatly reduced.

Dynamo electric machines of the synchronous type are built in two forms, namely, one in which each pole has a single coil or exciting winding surrounding it, known as the salient pole form, and the other, known as the distributed field form, with the exciting winding for each pole divided into two or more coils located in slots or spaces in the pole core dividing the core into three or more members. In the best and most improved machines of these two forms, the pole face is shaped so that it diverges from the armature surface toward the pole tips and away from the center of the poles, and is shaped so that under the central portions, at least, the resulting flux density distribution is smooth although not always a sine wave. However, in all of the usual machines the flux density is much too low in the vicinity of the neutral axis or line midway between opposite poles, which reduces the efficiency of these machines. This deviation from the desired flux density is so marked as to give a pronounced reversed curvature to the flux density wave, which, upon analysis, indicates components of considerable interfering or noise producing quality. We find that this is due partly to improper shaping of the pole face adjacent to the tip, failure to extend the tips close enough toward each other, and to the frequent use of coil holders of magnetic material between the poles.

In order to improve the flux distribution and the wave of induced electromotive force, and hence the efficiency of machines of this type, we shape the pole face adjacent to the tips so that the equivalent air-gap or clearance from the pole face to the equivalent smooth core armature surface, hereinafter defined, varies approximately inversely as a sine wave or other desirable wave of flux density. We find that substantial improvement will result from this, but also find, owing to the curvature and inclination of the lines of force near the neutral axis and in the interpolar regions, that this simple rule needs modification for more perfect results, namely, when the desired flux density wave increases less rapidly than the distance from the neutral axis, as with a sine wave, the pole tip should be brought slightly closer to the armature surface, and vice versa. We also extend the pole tip so that its distance from the neutral axis is not greater than 1.2 times the equivalent air-gap or the distance from the equivalent smooth core armature surface, and preferably from 1.0 to 0.7 times that distance so that practically none of the lines of force from the armature have to pass around the pole tip to reach the pole, but pass to the pole face directly. Furthermore, we make the coil holders, when such are desired from structural reasons, of non-magnetic material, to avoid their effect of diverting magnetic lines from the armature.

We find that these improvements apply equally well to machines of the synchronous type with poles of alternate north and south polarity, whether they are of the salient pole form or of the form with a plurality of coils for each pole.

Figure 4:
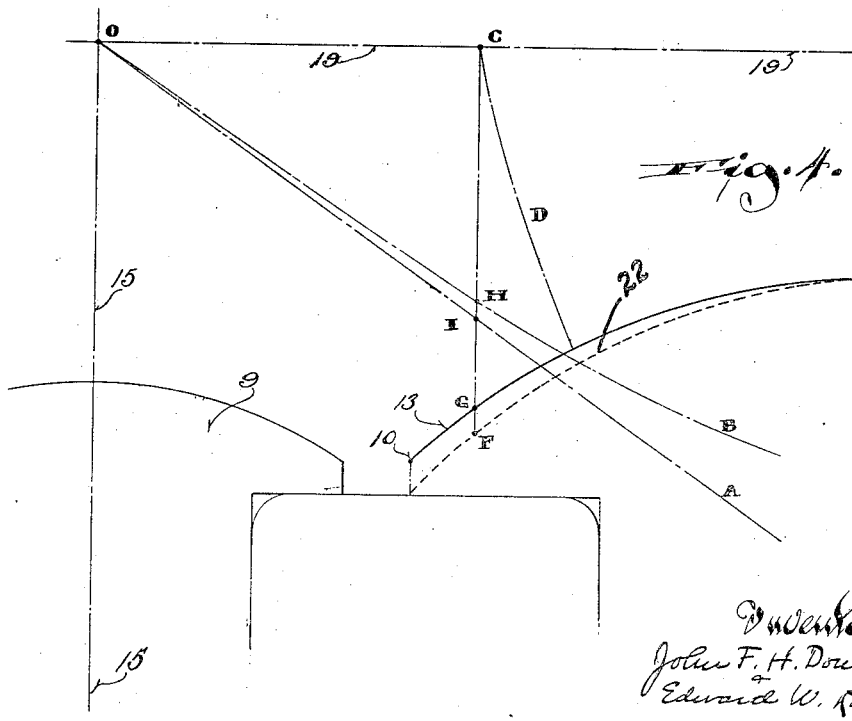

For the better understanding of our invention, reference is made to the following description taken with the accompanying drawings, in which Fig. 1 is a detail end elevation of a portion of a dynamo electric machine of the salient pole form; Fig. 2 is a detail end elevation of a portion of a dynamo electric machine of the distributed field form; Fig. 3 is a sectional view of either type along the line 15—15; and Fig. 4 is an enlarged detail of the pole tip in both Figs. 1 and 2, with construction lines showing how the pole is shaped adjacent to the tip.

In Fig. 1 the spider designated 1 is mounted on a shaft, not shown, in a well known manner, and supports the pole yoke 2. The pole core 3 is fastened to the yoke in any suitable manner and may be made of one or more pieces, the portion adjacent to the armature being termed the pole shoe, which may be of one piece with the pole core or attached to it in any suitable manner, the pole shoe being customarily and preferably made of iron laminations. The field coil 6 is made of copper wire or ribbon, as desired, and is shown in section and in elevation. A coil holder 9 is shown made of non-magnetic material; which may be used or omitted as is desired for structural reasons. The pole tip, or that point of the pole which most closely approaches the tip of the next pole, is represented by 10, and 11 is the surface of the pole in its central portion, and 13 is the surface of the pole in its outer portion adjacent to the tip. The trace of the surface of symmetry between adjacent poles is shown by the lines 15—15, which is referred to in these specifications as the neutral axis, since it is magnetically neutral. This surface is ordinarily a plane passing through the shaft half way between adjacent poles.

The actual surface of the armature is 16, being broken into teeth 17 and slots 18. For the purpose of design, however, it is customary to make computations from a surface which is assumed to have the same magnetic characteristics as the toothed surface but which is a smooth core surface. Such a surface will lie a predetermined distance back from the tips of the teeth 17. The distance of this smooth core surface from the actual tips of the teeth is found by the product of the actual air gap and a term known as the "air-gap coefficient."

This term "air-gap coefficient" is also known as "extension coefficient for effective air-gap in toothed armatures," and under these names is referred to by C. C. Hawkins in his book "The Dynamo," Pittmann's 1922, page 492, and also in the index list of symbols, page XVIII.

While this extension coefficient or air-gap coefficient, as computed by the charts in the authority cited varies to some extent, the distance from the equivalent armature surface 19—19 to the tips of the teeth 17 is substantially constant. The surface 19—19 may, therefore, be assumed as a circular cylinder having as its axis the center of the shaft.

The actual air-gap we define as the distance from the circle passing through the tips of the teeth to the pole surface. The magnetic lines of force, however, are longer opposite a slot in the armature than opposite a tooth. The flux entering a tooth pitch is less than what would enter the same space were the slot openings filled with iron, but is the same as would enter the same space with the smooth core armature with a somewhat longer air-gap. The gap to the smooth core armature, which would, for each point of the pole, give substantially the same average flux density per tooth pitch as from the pole to the actual toothed armature, we define as the effective or equivalent air-gap; and the approximate locus of all points of the equivalent air-gap measured radially from the poles correspond substantially to the equivalent armature surface which is represented in the drawings by the line 19—19. Thus, the effective or equivalent air-gap is determined by the actual air-gap multiplied by the air-gap coefficient or extension coefficient mentioned above. The armature core 20 of iron laminations, of which the teeth 17 are part, is supported by a frame or yoke in any suitable manner. The armature coils 21 shown in section and in elevation are contained in the armature slots, and are disposed in any manner that is customary or suitable.

In Fig. 2, representing a synchronous machine of the distributed field form, the above description applies with the following exceptions: The pole core is now divided into members 3 and 5, of which the central member 3, while magnetically a unit, may be divided structurally as seems most desirable. The members 5 may be termed the outer members. These divisions of the core serve to support, space, or secure the exciting winding. This winding is now divided into several coils 6 and 7; the central portion of the core 3 is surrounded by all coils and the outermost portions of the core 5 are surrounded by one coil only, 6. The surfaces of members 3 and 5 are 11 and 13. The central portions of the pole face in both Figs. 1 and 2 are diverging from the armature surface as one leaves the center of the pole. The outer portions of the pole face 13, adjacent to the pole tips 10 in both Figs. 1 and 2, are inclined to the equivalent armature surface 19 at a greater angle than the central portions 11.

In both Figs. 1 and 2 we shape the pole face 13 adjacent to the tip 10 so that the tip 10 approaches the neutral axis 15—15 to a distance not greater than 1.2 times the equivalent air-gap or the distance of the pole tip 10 from the equivalent smooth core armature surface 19—19, and preferably less. We find that the wave of flux density improves as the tips are brought closer to the neutral axis, until the distance of the tip 10 to the neutral axis 15—15 is 0.7 times the distance of the tip 10 to the equivalent smooth core armature surface 19—19 or equivalent air-gap. We find that the preferable ratio of these distances should be from 1.0 to 0.7. We show coil holders 9 of non-magnetic material, which may be used or omitted as desired for structural reasons, in order to avoid the diversion of armature flux, and the lowering of the flux density opposite them to less than what is desirable. We define "coil holder" as a member with a projecting tip engaging the coil and taking up the effects of centrifugal force. We shape the pole adjacent to the tips approximately so that the distance from any point of the face to the equivalent smooth core armature surface 19—19 of the equivalent air-gap varies inversely as the desired flux density opposite that point.

We find, however, that further modifications are desirable to provide the proper shape to the portion 13 of the pole, and in Fig. 4 show one way in which this may be obtained. In this figure 19—19 is the equivalent smooth core armature surface, 13 is the desired shape of the pole face adjacent to the tip 10, 15 is the neutral axis, and 22, shown dotted, is the pole face laid out to the approximate rule given above, the more desirable form 13 diverging from 22 toward the tips 10. B is a curve representing the desired flux density, in such a manner that at any point C of the armature surface the line CH represents the desired flux density. A sine wave or other desirable wave of flux distribution deviates from a straight line only slightly, so that the line A, drawn tangent to B at the intersection of neutral axis 15—15 with the equivalent smooth core armature surface 19—19 at O, deviates from B only slightly, the deviation at C being HI. For a sine wave and other desirable waves the deviation of B from A, namely HI, bears to CI a proportion that varies as the square of the distance OC. When the magnetic lines from the pole to the armature are assumed straight, as CF or equivalent air-gap, the pole face distance CF or equivalent air-gap would vary inversely as the density CH, but owing to the inclination and curvature of the actual flux line CD the pole face should be advanced from F to G for best results. We show in Fig. 4 a pole face 13 which is advanced at each point in such a manner that GF is to GC as the ratio of HI to HC multiplied by the square of the ratio of CG to OC. In somewhat different words $$GF/GC = (HI/HC)(GC/OC)^2.$$

As OC becomes larger the approximate and the corrected pole face rapidly approach each other, so that the correction is needed only adjacent to the pole tip 10.

From the foregoing description it will be noted that by spacing the poles a less distance apart than the usual practice and within the limits of 1.2 to 0.7 times the distance of the tip to the equivalent smooth core armature surface that improved results are obtained, and that the shaping of the poles adjacent the tips also improves the efficiency of dynamo electric machines. While both of these factors contribute individually to the obtaining of better efficiency, their combined effects give the best results.

By the term "desired or desirable wave of flux distribution" we mean a sine wave or one which does not deviate therefrom at any point more than 10% and also does not deviate therefrom in such a manner as to cause objectionable telephone interference.

We have shown our invention, illustrated as a multipolar machine, in one instance with one field coil per pole and in the other with two field coils per pole but it is evident that the invention is not limited to any particular number of poles or field coils per pole.

By the term "dynamo electric machine of the synchronous type," in the specification and claims, we mean an alternator or synchronous motor.

We aim to cover in the appended claims all modifications which do not depart from the spirit and scope of our invention.

What we claim as new and desire to secure by Letters Patent of the United States is:

1. In a dynamo electric machine of the synchronous type, a pole tip approaching the neutral axis at a distance not greater than 1.2 times its distance from the equivalent armature surface.

2. In a dynamo electric machine of the synchronous type, a pole tip distant from the neutral axis from 1.0 to 0.7 times its distance from the equivalent armature surface.

3. In a dynamo electric machine of the synchronous type, a pole face having its portion adjacent the tip diverging to some extent from the theoretical design in which the distance at any point from the equivalent armature surface varies inversely as the desired wave flux distribution, said divergence being toward the armature surface when the desired flux distribution varies less rapidly than the distance from the neutral axis.

4. In a dynamo electric machine of the synchonous type, a pole face having its portion adjacent the tip diverging to some extent from the theoretical design in which the distance at any point from the equivalent armature surface varies inversely as the desired wave of flux distribution, said devergence being slightly away from the armature surface when the desired flux distribution varies more rapidly than the distance from the neutral axis.

5. In a dynamo electric machine of the synchronous type, a pole face having its portion adjacent the tip proportioned so that at any point on the face of this portion the percentage of deviation of the equivalent air-gap from the approximate value of the equivalent air-gap, computed on the basis of straight lines of force, is equal to the percentage of deviation of the desired wave of flux distribution from the straight line variation in terms of the desired flux distribution multiplied by the square of the ratio of the equivalent air-gap to the distance from the point to the neutral axis.

6. In a dynamo electric machine of the synchonous type, the combination of a pole face having its portion adjacent the tip shaped approximately so that the equivalent air-gap varies inversely as the desired wave of flux distribution and the pole tip distant from the neutral axis not greater than 1.2 times its distance from the equivalent armature surface.

7. In a dynamo electric machine of the synchonous type, a pole face having its portion adjacent the tip shaped approximately so that the equivalent air-gap varies inversely as the desired wave of flux distribution and having its tip spaced from the neutral axis not greater than 1.2 times its distance from the equivalent armature surface.

In testimony whereof we affix our signatures.

JOHN F. H. DOUGLAS.
EDWARD W. KANE.